Figure 1:
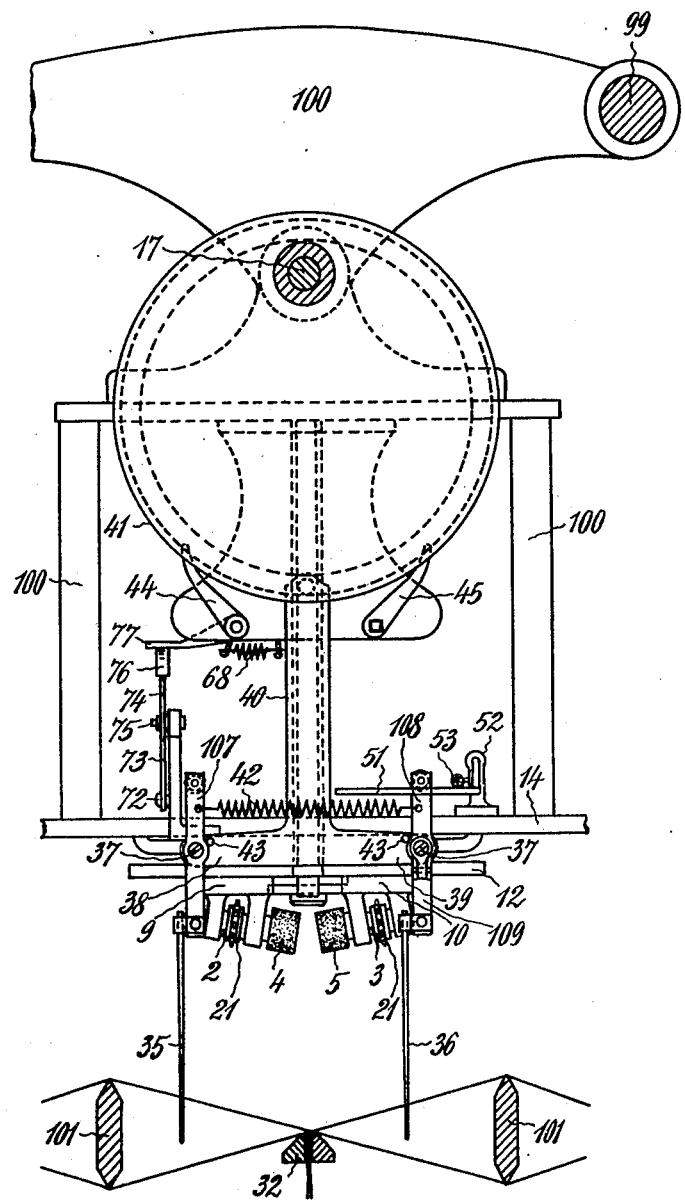

G. HILLER.
WARP TWISTING-IN MACHINE.
APPLICATION FILED NOV. 29, 1907.

913,499.

Patented Feb. 23, 1909.
6 SHEETS—SHEET 1.

WITNESSES

INVENTOR
Gustav Hiller
By Wm Wallace White
ATTY.

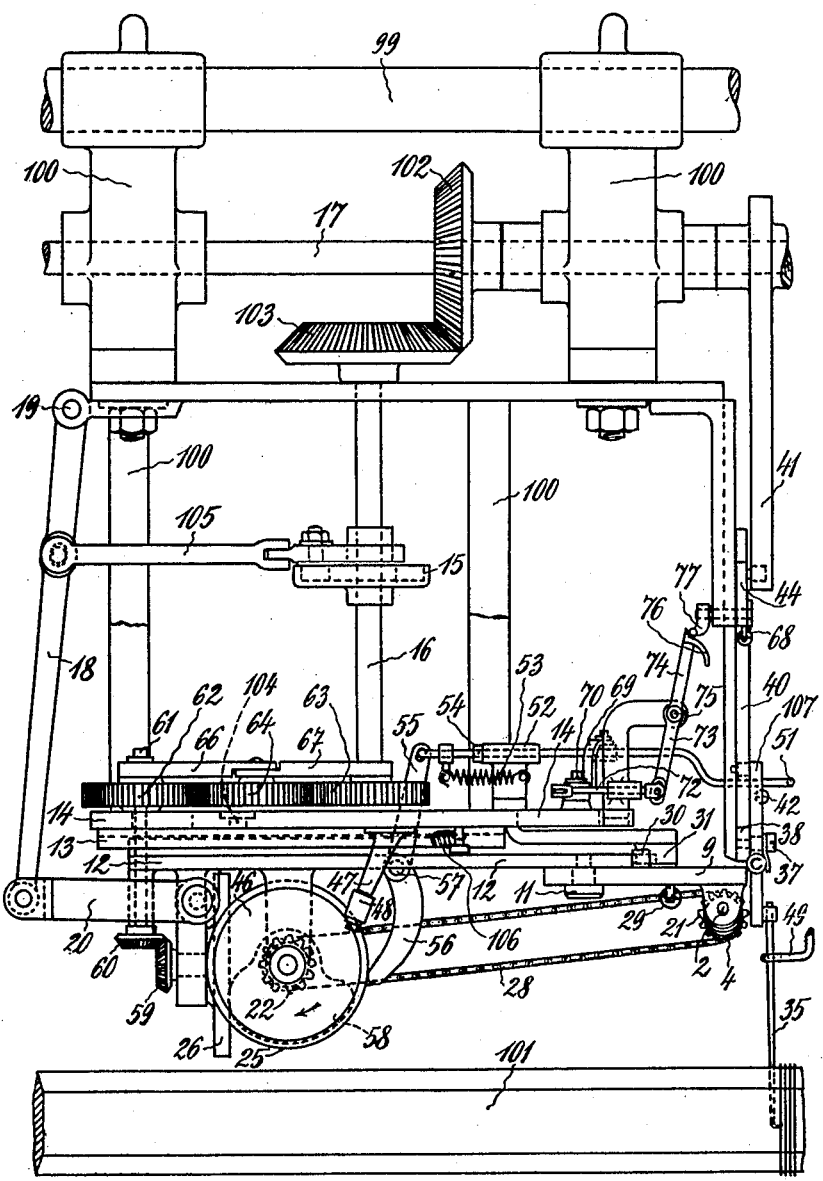

G. HILLER.
WARP TWISTING-IN MACHINE.
APPLICATION FILED NOV. 29, 1907.
913,499.
Patented Feb. 23, 1909.
6 SHEETS—SHEET 3.
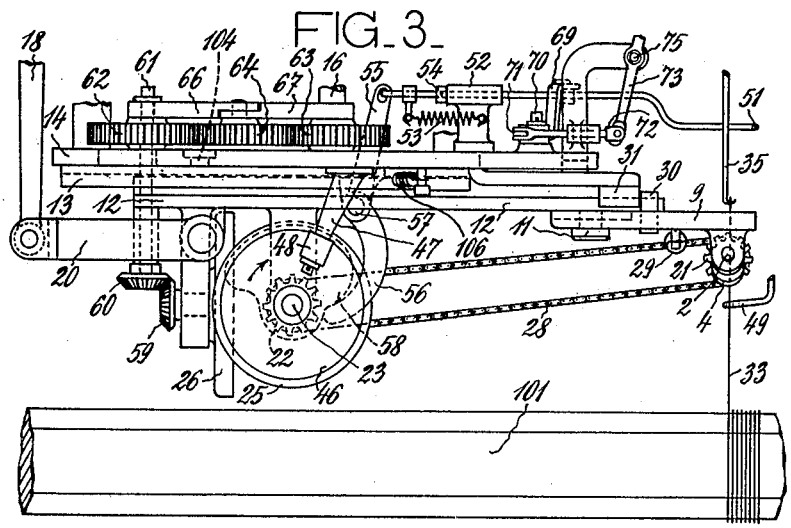
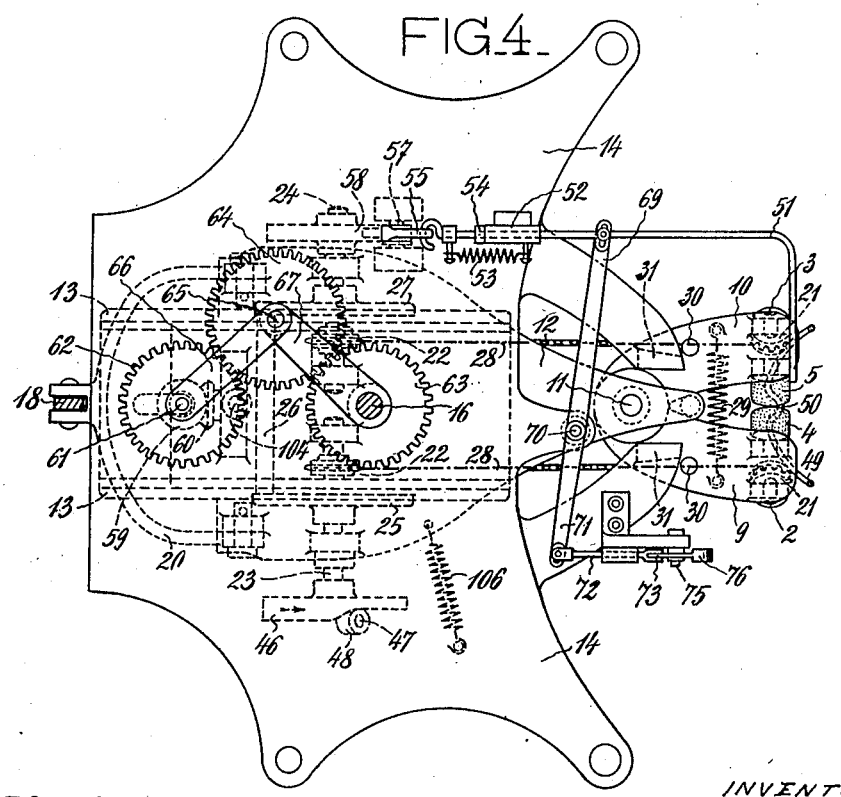
WITNESSES
INVENTOR
Gustav Hiller
By Wm Wallace White
ATT'Y

G. HILLER.
WARP TWISTING-IN MACHINE.
APPLICATION FILED NOV. 29, 1907.

913,499.

Patented Feb. 23, 1909.
6 SHEETS—SHEET 4.

WITNESSES

INVENTOR
Gustav Hiller

G. HILLER.
WARP TWISTING-IN MACHINE.
APPLICATION FILED NOV. 29, 1907.

913,499.

Patented Feb. 23, 1909.
6 SHEETS—SHEET 5.

WITNESSES

INVENTOR
Gustav Hiller
By Wm Wallace White
ATT'Y.

G. HILLER.
WARP TWISTING-IN MACHINE.
APPLICATION FILED NOV. 29, 1907.
913,499.
Patented Feb. 23, 1909.
6 SHEETS—SHEET 6.
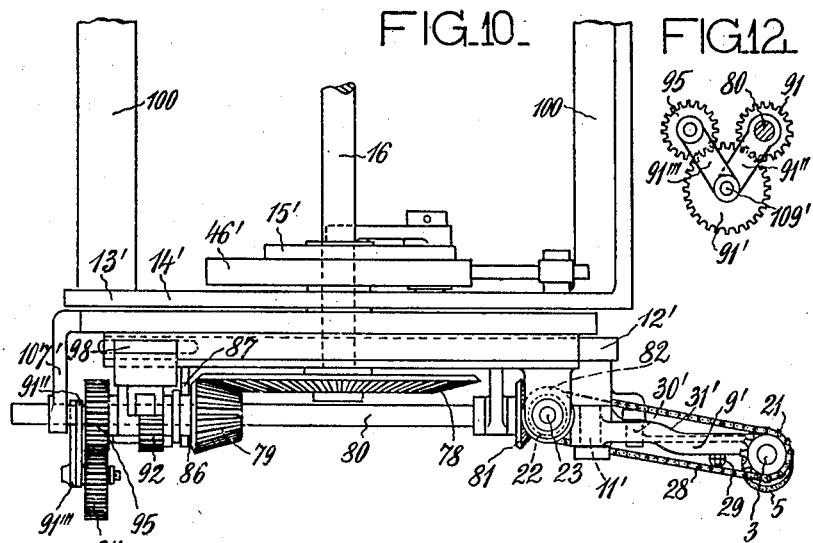
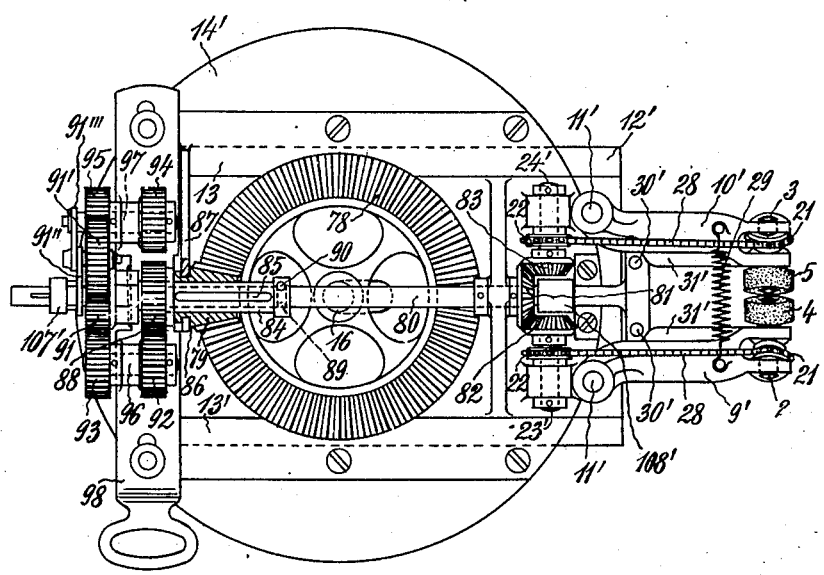
WITNESSES
INVENTOR
Gustav Hiller
By Wm Wallace White
ATT'Y.

UNITED STATES PATENT OFFICE.

GUSTAV HILLER, OF ZITTAU, GERMANY.

WARP-TWISTING-IN MACHINE.

No. 913,499. Specification of Letters Patent. Patented Feb. 23, 1909.

Application filed November 29, 1907. Serial No. 404,359.

*To all whom it may concern:*

Be it known that I, GUSTAV HILLER, a subject of the King of Saxony, residing at 1 Ottokarplatz, Zittau, in the Kingdom of Saxony and Empire of Germany, have invented new and useful Improvements in or Relating to Warp-Twisting-In Machines, of which the following is a specification.

In warp twisting-in machines, in which the ends of warps are mechanically joined by twisting-in, in a similar manner as is effected by hand, hitherto chiefly two kinds of twisting-in devices were employed. The device of the one kind essentially consists of a pair of straight or curved jaws with pads or linings and adapted to move in opposite directions along one another, so that two warp-ends were together inserted between the two jaws and joined by twisting-in during the relative motion of the latter. In this case only the motion of each jaw in one direction was utilized for the twisting-in operation, while the return of each jaw in the opposite direction did not produce any effect. This means, that the efficiency of the machine was kept comparatively low, in spite of the fact that the remaining parts of the machine moved more rapidly. Moreover the pads or elastic linings of the jaws were worn away most rapidly and required to be frequently replaced, which was very inconvenient and took up much time, while the machine was necessarily stopped for a long time. In order to avoid the principal defects of devices of this kind, the device of the other kind was devised and it consists of a pair of rotating tongs adapted to seize the two warp-ends for twisting them by rapidly rotating, they making many revolutions. In this case, of course, the wear of the tongs was *nil*, however, the efficiency of the machine could not be increased considerably, since the pair of tongs required to make each time 50 to 60 revolutions for joining two warp-ends, in order to produce a sufficiently reliable joint. This high number of revolutions took up a not inconsiderable time, so that the work of the machine was thereby limited. Moreover the rotation of the pair of tongs required to be each time stopped for the insertion of the warp-ends and the withdrawal of the joined warps. Therefore it was impossible to put the device into a continuous motion, whereby the machine might be protected as far as possible from all shocks.

My invention relates to a new twisting-in device, whereby all the said defects of the known devices are avoided, so that the efficiency of the machine is enlarged and only limited by the already high speed of the machine parts which effect the taking up of the warp-ends and the placing of the twisted warp-ends along one warp.

The new device consists of a pair of cylindrical friction disks, which are driven in opposite directions and are adapted to be pressed together on their faces for twisting the warp-ends previously inserted between them. Preferably the shafts carrying the two friction disks are inclined, so that the opposite faces of the latter form between them an acute angle and only the peripheries of the two disks can touch each other on a place above, where the warp-ends are inserted and twisted in one direction. With this device also means for cutting the twisted warp-ends can be combined, either of the two friction disks or both of them being provided with a knife for dividing the twisted warp-ends from the rests in the clamp, so that this knife during the rotation of the friction disk cuts the warps tightened between the clamp and the friction disks. In a similar manner as in other warp twisting-in machines, the new device is combined with a device for placing the twisted warp-ends with an additional twist along one of the two warps, so that they are enabled to coil round it and thus form the joint.

Where so preferred, the improved warp twisting-in machine may according to my invention be provided with a reversing gear, by means of which the direction of the twist can be chosen.

I will now proceed to describe my invention with reference to the accompanying drawings, in which—

Figure 5:
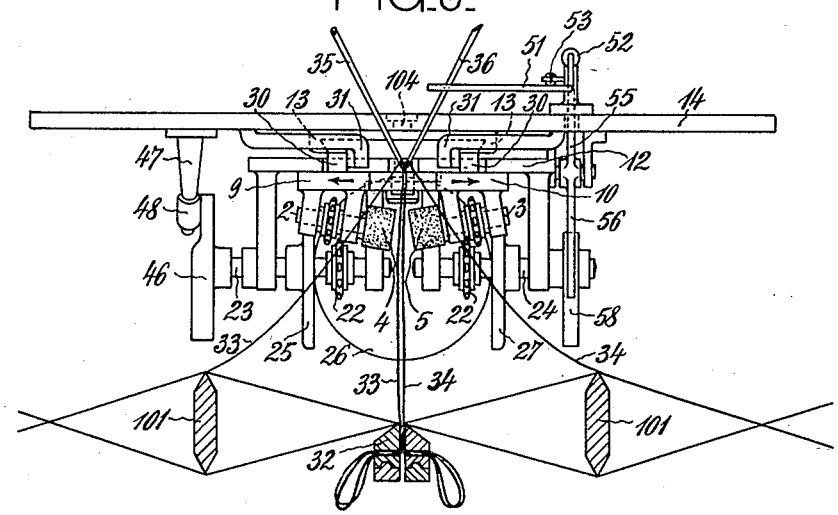
Figure 6:
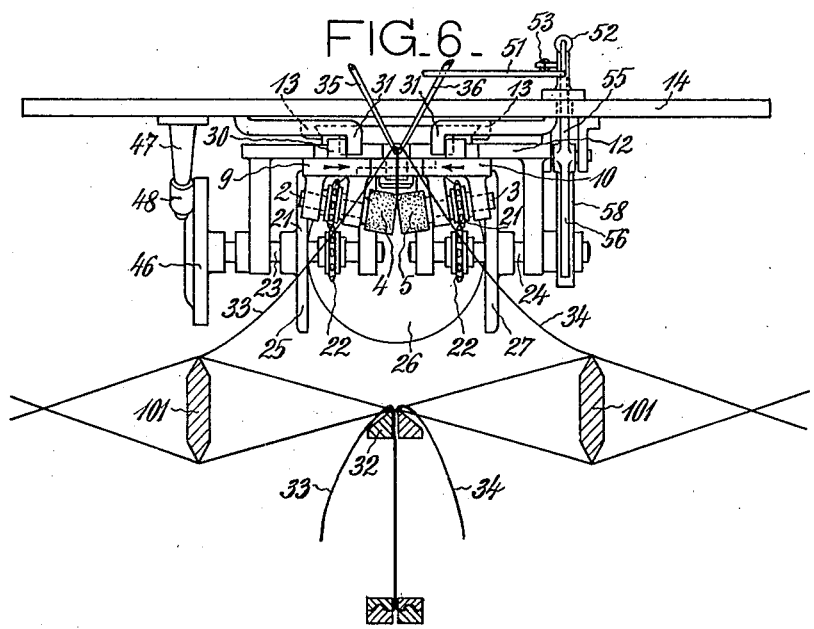
Figure 7:
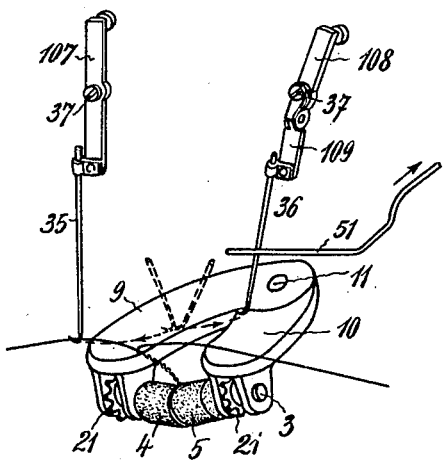
Figure 8:
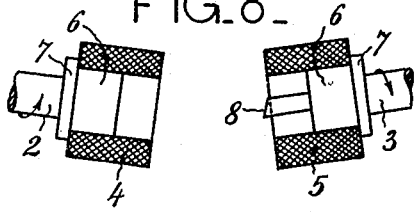
Figure 9:
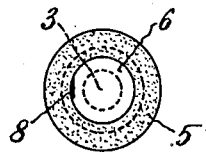

Figure 1 is a side view of the improved warp twisting-in machine in a mode of execution, parts being shown in section, Fig. 2 is an elevation of the same, Fig. 3 is a lower part out of Fig. 2, in which a slide below with all parts connected therewith has been shifted from left to right and two warp-ends have been taken up, Fig. 4 is a plan of the same, Fig. 5 is a lower part out of Fig. 1 and shows further parts, two warp-ends being shown as taken up and inserted between the two detached rotary friction disks, Fig. 6 is the same as before, only that the two warp-ends have been cut from the rests and are being twisted by the two rotating friction disks, Fig. 7 is a perspective view of the two rotating friction disks and certain parts therewith connected, the two warp-ends having been twisted and being about to be placed along the right warp, Fig. 8 is an elevation of parts of the shafts carrying the two rotating friction disks, the latter being shown in section, Fig. 9 is an end view of one rotating friction disk with a knife in it, Fig. 10 is an elevation of the lower part of a modified warp twisting-in machine which is provided with a reversing gear, Fig. 11 is a bottom view of the same, and Fig. 12 is a detail, which will be referred to later on.

Similar characters of reference refer to similar parts throughout the several views.

The warp twisting-in machine comprises a frame 100 of any known construction, which is suspended from two parallel horizontal guiding rods 99, 99 and can be shifted thereon in any known manner over the known lease rods 101, 101, of which one belongs to the old lease and the other to the new lease, the warp-ends being in a known manner secured in a clamp 32. I do not further describe these parts, as they are known and immaterial to my invention. A shaft 17 passing through the frame 100 serves for transmitting the motion to the machine by means of two bevel wheels 102 and 103 and a vertical shaft 16.

On the underside of the bottom plate 14 of the frame 100 a rectangular guiding plate 13 (see Fig. 4) is mounted to rock around a vertical pin 104, while a slide 12 is longitudinally movable in the guiding plate 13. The slide 12 is pivotally connected by means of a forked link 20 (see Fig. 4) with a lever 18 fulcrumed at 19 on the frame 100 and a cam disk 15 of any known construction fastened on the vertical shaft 16 is adapted to put the slide 12 into a reciprocating motion by means of a connecting rod 105 and the parts 18 and 20 already mentioned. A vertical shaft 61 is mounted to turn in a bush made in one piece with the slide 12 and passes through a slot in the bottom plate 14, this slot permitting the slide to reciprocate. The shaft 61 is driven from the vertical shaft 16 by means of three gear wheels 63, 64 and 62, of which one 63 is fastened on the shaft 16, another one 62 is fastened on the shaft 61 and the third one 64 is turnable on a pin 65, which combines two links 66 and 67, that are turnable on the two shafts 16 and 61 respectively. The shaft 61 serves for driving a friction disk 26 by means of two bevel wheels 60 and 59 and a horizontal shaft, which latter turns in a bracket on the slide 12. The friction disk 26 in turn drives two friction wheels 25 and 27 in opposite directions, these two friction wheels being fastened on two separate shafts 23 and 24, which are placed in the same axis and are mounted to turn in brackets on the slide 12. On one shaft 23 is fastened a cam disk 46 and on the other shaft 24 a cam disk 58. A helical spring 106 (see Fig. 4) connects the slide 12 with the bottom plate 14 and serves for pressing the cam disk 46 against a roller 48, which turns on a stationary stud 47 fastened on the bottom plate 14. It will be seen, that the guiding plate 13 normally occupies the position shown at Fig. 4 and the slide 12 is guided in its center line parallel to the driving shaft 17, as long as the roller 48 bears on the bottom of the recess in the cam disk 46 (see Fig. 5). When, however, during the rotation of the shaft 23 in the direction of the arrow in Fig. 4 the cam on the disk 46 strikes the roller 48 and runs over the same, the guiding plate 13 with the slide 12 will be turned to the right in Figs. 1, 5 and 6, that is in a direction opposite to that of the hands of a clock in Fig. 4. The cam disk 58 on the other shaft 24 is adapted to periodically actuate the lower arm 56 of a two-armed lever 56, 55, which latter is fastened on a pin 57 that rocks in suitable brackets on the bottom plate 14. The upper arm 55 of the said lever engages the hooked end of a puller 51, which latter is guided in a support 52 on the bottom plate 14 and is constantly pressed to the right in Fig. 4 or to the front in Figs. 1, 5 and 6 by a helical spring 53. A loose collar 54 with set-screw checks the action of the spring 53 and determines the normal position of the puller 51. Fastened in the slide 12 is a pin 11, on which two levers 9 and 10 (see Fig. 4) are mounted to rock, while they are drawn together by a helical spring 29. The two levers 9 and 10 are each provided with a pin 30 and the two pins 30, 30 are adapted to glide on two oppositely inclined guides 31, 31, which are rigidly connected in any suitable manner with the bottom plate 14. A pin at the extreme right end of the slide 12 in Fig. 4 engages between the two levers 9 and 10 and serves for preventing them from turning, if their pins 30, 30 are released by the inclined guides 31, 31, see also Fig. 1. It will be seen, that when the slide 12 is moved from right to left in Fig. 4, the two guides 31, 31 will by means of the pins 30, 30 move the two levers 9 and 10 away from each other. The two levers 9 and 10 are each made in one piece with two brackets (see Fig. 7), in which a shaft 2 or 3 respectively is mounted to turn. Preferably the two shafts 2 and 3 are slightly inclined to one another as shown, their axes crossing each other in a point in the vertical central plane of the slide 12. The two shafts 2 and 3 are driven in opposite directions from the two shafts 23 and 24 mentioned above by means of chain wheels 22 and 21 and endless chains 28, 28. The opposite ends of the two inclined shafts 2 and 3 are enlarged in diameter (see Fig. 8) and form heads 6, 6, on which two preferably annular friction disks 4 and 5, say of elastic material, are disposed. Preferably collars 7, 7 are provided on the two shafts 2 and 3 for preventing the friction disks 4 and 5 from longitudinally shifting. When the two levers 9 and 10 are released by the inclined guides 31, 31, the two friction disks 4 and 5 will be pressed together by the helical spring 29, so that they will touch one another at an upper point of their peripheries, see Fig. 7. It is at this point, where the two friction disks 4 and 5 rotating in opposite directions are adapted to twist the warp-ends inserted between them. A knife 8 is inserted between a head 6 and a friction disk 5 and is permitted to project a little, so that it during the rotation of the two shafts 2 and 3 meets the twisted warp-ends and cuts them from the rests. The cutting edge of the knife 8 is made to descend in the direction of the rotation, as is shown in Fig. 8.

In a suitable part of the frame 100 a ⊥-shaped piece 38, 39, 40 is vertically guided, which by means of a pin at its upper end engages in a groove of a cam disk 41 fastened on the shaft 17 and is thereby reciprocated. The extreme ends of the two arms 38 and 39 below are each provided with a pin 37 and on the two pins 37 two two-armed levers 107 and 108, 109 are mounted to rock. The lower arms of these levers carry the known warp-hooks 35 and 36, which can swing in a vertical plane parallel to the warps. The lower arm 109 of the right lever 108, 109 in Fig. 7 is connected with the upper arm by means of a pin at right angles to the pin 37, so that it can swing in a vertical plane at right angles to the warps. The puller 51 is adapted to pull the lower arm 36 to the rear in Fig. 7 for releasing the warp. The upper arms of the two levers 107, and 108, 109 are normally drawn together by a helical spring 42 for bringing the two warp-hooks 35 and 36 into the vertical position shown at Fig. 1, stops 43, 43 being provided on the arms 38 and 39 for limiting the outward motion of the hooks 35 and 36. Rollers are provided at the upper ends of the two levers 107, and 108, 109 and are adapted to strike and to roll on two inclined guides 44 and 45 on the frame 100, when the ⊥-shaped piece 38, 39, 40 is moved upwards by the cam disk 41. One guide 44 is mounted to rock on a pin and is normally pressed downwards by a helical spring 68. The downward motion of the guide 44 is normally checked by its arm 77 resting on a curved projection 76 on the upper arm 74 of a two-armed lever 73, 74, which latter rocks on a pin 75 that is fastened on a suitable support on the bottom plate 14. The lower arm 73 of the lever 73, 74 is pivotally connected with a point on the puller 51 by means of a connecting rod 72 and a two-armed lever 71 rocking on a pin 70 on the bottom plate 14. As the two-armed lever 73, 74 swings in a vertical plane at right angles to that of the guide 44, it is obvious, that the upper arm 74 on being turned to the left in Fig. 2 will by its projection 76 release the arm 77 and permit the guide 44 to turn downwards.

A bent wire 49 (of which only the lower part is shown) is secured on the frame 100 and serves for guiding in a known manner the warp-ends lifted by the two warp-hooks 35 and 36. This wire 49 is so bent in the middle (that is in the vertical central plane of the machine) as to form a recess 50, into which the warp-ends can glide.

The warp twisting-in machine operates as follows: The warp-ends of the old and new leases are secured in a known manner in the clamp 32. When during the motion of the machine its parts at a moment occupy the position shown at Figs. 1 and 2, the two warp-hooks 35 and 36 are vertical and in their lowest position, while the slide 12 is in its extreme position on the rear in Fig. 1 or on the left in Fig. 2, so that the two constantly rotating friction disks 4 and 5 are detached. During the continued motion of the machine the cam disk 41 will by means of the parts 40, 39, 38, 107 and 108, 109 move the two warp-hooks 35 and 36 upwards, so that they engage beneath the respective warps 33 and 34 and raise them. Near the end of the upward stroke the rollers on the upper ends of the two levers 107 and 108, 109 will strike the two guides 44 and 45 and turn the two warp-hooks 35 and 36 inwards, until their ends nearly touch each other, as is shown at Fig. 5. During this motion the parts of the warps 33 and 34 between the hooks 35 and 36 and the clamp 32 will strike the two sides of the bent wire 49 and glide on them, until at last they get into the recess 50. Meanwhile by means of the cam disk 15 the slide 12 is moved to the front in Fig. 1 or to the right in Fig. 2, so that the two inclined guides 31, 31 at last release the two levers 9 and 10 and permit the two rotating friction disks 4 and 5 to seize the two warps 33 and 34 now inserted between them and to twist them up to the warp-hooks 35 and 36 in one direction and down to the clamp 32 in the opposite direction. The various machine parts are so proportioned, that the two rotating friction disks 4 and 5 seize the two warps 33 and 34 at the moment that the knife 8 is on the rear in Fig. 8, so that after about a quarter of a revolution of the friction disk 5 the knife 8 cuts the tightened warps 33 and 34 and thus divides them from the rests, which drop, as is shown at Fig. 6. About at this moment the cam on the disk 46 acts upon the roller 48, so that thereby the guiding plate 13 together with the slide 12 is turned and the two rotating friction disks 4 and 5 with the ends of the warps between them are shifted to the right in Fig. 6. At the same time the cam disk 58 acts upon the lower bent arm 56 for withdrawing the puller 51, which then turns the right warp-hook 36 to the rear in Fig. 7, so as to release the right warp 34, whereupon the latter receives an additional twist, since the two rotating friction wheels 4 and 5 continue to twist the warp-ends. And at the same time by means of the two-armed lever 69, 71, the connecting rod 72 and the two-armed lever 73, 74 the curved projection 76 is withdrawn, so as to permit the arm 77 to drop under the action of the helical spring 68, so that the guide 44 turning downward strikes the roller on the upper arm of the two-armed lever 107 and thereby turns the left warp-hook 35 to the left in Fig. 7. Thus the twisted warp-ends are placed along the right warp 34, so that they are enabled to coil around the warp 34 while more or less tightening the latter, until they are released by the two rotating friction disks 4 and 5 during the withdrawal of the slide under the action of the cam disk 15. In this manner the usual joint is formed. Of course the operation just described of the machine may be varied, the various machine parts being proportioned in any other suitable manner, while the effect obtained should be the same.

The machine described is adapted to twist in only warps having a twist of one direction (for instance right-hand), and not warps having the opposite twist (for instance left-hand). If it is desired to twist in at will warps with left-hand twist or with right-hand twist, the machine is according to my invention modified and provided with a reversing gear, as is for example shown at Figs. 10 to 12. Here the guiding plate $13^1$ is made to rock on the bottom plate $14^1$ in any known manner around the axis of the vertical shaft 16, which latter passes through a slot in the slide $12^1$ and carries a large bevel wheel 78. The slide $12^1$ is adapted to be reciprocated from a cam disk $15^1$ on the shaft 16 in a similar manner as before and by means of parts which I do not describe, as they are immaterial to my invention. A second cam disk $46^1$ on the shaft 16 is adapted to rock by means of parts, which are also not described, the guiding plate $13^1$ with the slide $12^1$ for shifting the two rotating friction disks 4 and 5 to a side as described above. The two levers $9^1$ and $10^1$ are shown as mounted to rock on two separate pins $11^1$, $11^1$ on the slide $12^1$ and are provided with horizontal ribs $31^1$, $31^1$, which are adapted to strike two stationary pins $30^1$, $30^1$ and to glide thereon, when the slide $12^1$ is moved from right to left in Fig. 11, so that thereby the two rotating friction disks are detached. The said two pins $30^1$, $30^1$ are provided on a suitable bracket 108, which passes through recesses of both the guiding plate $13^1$ and the slide $12^1$ and is fastened on the bottom plate $14^1$ of the frame. On the guiding plate $13^1$ a slide 98 is guided in any suitable manner in the cross direction and carries two bearings 96 and 97 for two parallel shafts on which the gear wheels 94 and 95 on one side and the gear wheels 92 and 93 on the other side are fastened. A forked bracket 107 projects from the guiding plate $13^1$ through recesses both in the slide $12^1$ and in the slide 98 and a shaft 80 passes through it. The right end of the shaft 80 is mounted in a suitable part of the slide $12^1$ to turn and carries a bevel wheel 81, which meshes with two like bevel wheels 82 and 83 fastened on the two separate shafts $23^1$ and $24^1$. It will be understood, that during the reciprocating motion of the slide $12^1$ the shaft 80 moves through the forked bracket 107 on the left in Fig. 11. A sleeve 84 is mounted loose on the shaft 80 and is prevented from longitudinally shifting thereon by a pin 90 engaging in a groove 89 of the shaft 80. A small bevel wheel 79 meshing with the large bevel wheel 78 is longitudinally movable on the sleeve 84, while it is prevented from turning thereon by a feather 85 fastened in the sleeve 84 and engaging in its groove. The bevel wheel 79 is rigidly connected with a gear wheel 88 and both are prevented from longitudinally shifting relatively to the guiding plate $13^1$ by a forked arm 87 secured on the latter and engaging in a groove between the bevel wheel 79 and the gear wheel 88. The length of the sleeve 84 is made such, that for the extreme position of the slide $12^1$ on the left in Fig. 11 the sleeve 84 just touches the bearing 107, while for the other extreme position of the slide $12^1$ the gear wheel 88 is supported by the bevel wheel 79 resting on the sleeve 84. The shaft 80 passes through a gear wheel 91 between the two arms of the forked bearing 107, and the gear wheel 91 is longitudinally movable on the shaft 80, but is in any known manner prevented from turning thereon. An intermediate gear wheel $91^1$ is provided and constantly meshes with the two gear wheels 91 and 95 (see Fig. 12), it turning on a pin 109 which combines two links $91''$ and $91'''$ that are turnable on the shaft 80 and the shaft of the gear wheels 94 and 95 respectively. When the slide 98 is shifted into the position shown at Fig. 11, the rotation of the vertical shaft 16 will be transmitted to the shaft 80 through the two bevel wheels 78 and 79, the gear wheels 88 and 92, the shaft of the latter and the two gear wheels 93 and 91, so that the two rotating friction disks 4 and 5 will twist the two warps (33 and 34 in Fig. 6) in one direction. When, however, the slide 98 is shifted into the other extreme position, the two gear wheels 88 and 91 will disengage from those 92 and 93 and the gear wheel 88 alone will engage the gear wheel 94. Then the rotation of the shaft 16 will be transmitted to the shaft 80 in the opposite direction through the bevel wheels 78 and 79, the gear wheels 88 and 94, the shaft of the latter and the three gear wheels 95, 91' and 91. In consequence of this the two rotating friction disks 4 and 5 will twist the two warps in the opposite direction.

The modified machine illustrated at Figs. 10 to 13 may be provided with other parts described above with reference to Figs. 1 to 9 but not shown in Figs. 10 to 13, so that it may operate in a similar manner to the preceding machine.

The warp twisting-in machine with or without reversing gear may be varied in many respects without departing from the spirit of my invention.

I claim:

1. In a warp twisting-in machine of the class described, the combination with two cylindrical friction disks each one adapted to rotate in an opposite direction to the other and both to touch one another on their faces, of means for pressing said two friction disks together, and means for inserting the warp-ends to be twisted-in between said two friction disks, substantially as described and for the purpose set forth.

2. In a warp twisting-in machine of the class described, the combination with two cylindrical friction disks adapted to rotate in opposite directions and to touch one another on their faces which between them form an acute angle, of means for pressing said two friction disks together, and means for inserting the warp-ends to be twisted-in between said two friction disks, substantially as described and for the purpose set forth.

3. In a warp twisting-in machine of the class described, the combination with two cylindrical friction disks adapted to rotate in opposite directions and to touch one another on their faces, of a knife within one of said two friction disks and projecting from the face, means for pressing said two friction disks together, and means for inserting the warp-ends to be twisted-in between said two friction disks, substantially as described and for the purpose set forth.

4. In a warp twisting-in machine of the class described, the combination with two cylindrical friction disks adapted to rotate in opposite directions and to touch one another on their faces which between them form an acute angle, of a knife within one of said two friction disks and projecting from the face, means for pressing said two friction disks together and means for inserting the warp-ends to be twisted-in between said two friction disks, substantially as described and for the purpose set forth.

5. In a warp twisting-in machine of the class described, the combination with two cylindrical friction disks adapted to touch one another on their faces, of means for pressing said two friction disks together, means for rotating each of said two friction disks in an opposite direction to the other, and means for inserting the warp-ends to be twisted-in between said two friction disks, substantially as described and for the purpose set forth.

6. In a warp twisting-in machine of the class described, the combination with two cylindrical friction disks, adapted to touch one another on their faces which between them form an acute angle, of means for pressing said two friction disks together, means for inserting the warp-ends to be twisted in between said two friction disks, and means for rotating said two friction disks in opposite directions, substantially as described and for the purpose set forth.

7. In a warp twisting-in machine of the class described, the combination with two cylindrical friction disks adapted to touch one another on their faces, of a knife within one of said two friction disks and projecting from the face, means for pressing said two friction disks together, means for inserting the warp-ends to be twisted-in between said two friction disks, and means for rotating said two friction disks in opposite directions, substantially as described and for the purpose set forth.

8. In a warp twisting-in machine of the class described, the combination with two cylindrical friction disks adapted to touch one another on their faces which between them form an acute angle, of a knife within one of said two friction disks and projecting from the face, means for pressing said two friction disks together, means for inserting the warp-ends to be twisted-in between said two friction disks, and means for rotating said two friction disks in opposite directions, substantially as described and for the purpose set forth.

9. In a warp twisting-in machine of the class described, the combination with two cylindrical friction disks adapted to touch one another on their faces, of means for pressing said two friction disks together, means for rotating said two friction disks in opposite directions, means for inserting the warp-ends to be twisted-in between said two friction disks, and means for reversing the direction of rotation of both of said two friction disks, substantially as described and for the purpose set forth.

10. In a warp twisting-in machine of the class described, the combination with two cylindrical friction disks adapted to touch one another on their faces which between them form an acute angle, of means for pressing said two friction disks together, means for inserting the warp-ends to be twisted-in between said two friction disks, means for rotating said two friction disks in opposite directions, and means for reversing the direction of rotation of both of said two friction disks, substantially as described and for the purpose set forth.

11. In a warp twisting-in machine of the class described, the combination with two cylindrical friction disks adapted to touch one another on their faces, of a knife within one of said two friction disks and projecting from the face, means for pressing said two friction disks together, means for inserting the warp-ends to be twisted-in between said two friction disks, means for rotating said two friction disks in opposite directions, and means for reversing the direction of rotation of both of said two friction disks, substantially as described and for the purpose set forth.

12. In a warp twisting-in machine of the class described, the combination with two cylindrical friction disks adapted to touch one another on their faces which between them form an acute angle, of a knife within one of said two friction disks and projecting from the face, means for pressing said two friction disks together, means for inserting the warp-ends to be twisted-in between said two friction disks, means for rotating said two friction disks in opposite directions, and means for reversing the direction of rotation of both of said two friction disks, substantially as described and for the purpose set forth.

13. In a warp twisting-in machine of the class described, the combination with two cylindrical friction disks adapted to touch one another on their faces, of means for pressing said two friction disks together, means for inserting the warp-ends to be twisted-in between said two friction disks, means for rotating said two friction disks in opposite directions, and a reversing gear for reversing the direction of rotation of both of said two friction disks, substantially as described and for the purpose set forth.

14. In a warp twisting-in machine, the combination with two cylindrical friction disks oppositely inclined to one another, of means for rotating said two friction disks in opposite directions, means for periodically pressing said two friction disks together on their faces, means for moving them away from each other, means for inserting two warp-ends at a time between said two friction disks when detached, the latter being adapted on being pressed together to twist the warp-ends, and means for placing the twisted warp-ends along one warp to enable them to coil around the latter, substantially as described and set forth.

15. In a warp twisting-in machine, the combination with two cylindrical friction disks oppositely inclined to one another, of a knife within one of said two friction disks and projecting from the face, means for rotating said two friction disks in opposite directions, means for periodically pressing said two friction disks together on their faces, means for moving them away from each other, a clamp for securing the warp-ends of an old and a new lease, means for raising two warp-ends at a time and inserting them between said two friction disks when detached, said friction disks being adapted on being pressed together to twist the warp-ends and said knife being adapted to cut the tightened warp-ends from said clamp, and means for placing the twisted warp-ends along one warp to enable them to coil round the latter, substantially as described and set forth.

16. In a warp twisting-in machine, the combination with two cylindrical friction disks oppositely inclined to one another, of means for rotating said two friction disks in opposite directions, means for periodically pressing said two friction disks together on their faces, means for moving them away from each other, means for inserting two warp-ends at a time between said two friction disks when detached, the latter being adapted on being pressed together to twist the warp-ends, means for placing the twisted warp-ends along one warp to enable them to coil round the latter, and a reversing gear for reversing at will the direction of rotation of both of said two friction disks, substantially as set forth.

17. In a warp twisting-in machine, the combination with two cylindrical friction disks oppositely inclined to one another, of a knife within one of said two friction disks and projecting from the face, means for rotating said two friction disks in opposite directions, means for periodically pressing said two friction disks together on their faces, means for moving them away from each other, a clamp for securing the warp-ends of an old and a new lease, means for raising two warp-ends at a time and inserting them between said two friction disks when detached, said friction disks being adapted on being pressed together to twist the warp-ends and said knife being adapted to cut the tightened warp-ends from said clamp, means for placing the twisted warp-ends along one warp to enable them to coil round the latter, and a reversing gear for reversing at will the direction of rotation of both of said two friction disks, substantially as set forth.

In testimony whereof I have signed my name to this specification in the presence of two subscribing witnesses.

GUSTAV HILLER.

Witnesses:
HERBERT SMITH,
JOSEF FREUND.